(12) United States Patent
Okamoto

(10) Patent No.: US 8,479,859 B1
(45) Date of Patent: Jul. 9, 2013

(54) ENERGY REGENERATION DEVICE FOR EITHER HYBRID VEHICLE OR ELECTRIC AUTOMOBILE

(76) Inventor: Akihiko Okamoto, Osaka (JP)

(*) Notice: Subject to any disclaimer, the term of this patent is extended or adjusted under 35 U.S.C. 154(b) by 0 days.

(21) Appl. No.: 13/819,129

(22) PCT Filed: Mar. 9, 2011

(86) PCT No.: PCT/JP2011/055489
§ 371 (c)(1),
(2), (4) Date: Feb. 26, 2013

(87) PCT Pub. No.: WO2012/029341
PCT Pub. Date: Mar. 8, 2012

(30) Foreign Application Priority Data

Sep. 1, 2010 (JP) .................................. 2010-195294

(51) Int. Cl.
*B60K 25/10* (2006.01)
(52) U.S. Cl.
USPC ........................................ 180/165; 180/65.31
(58) Field of Classification Search
USPC ................... 180/165, 2.1, 65.21, 65.31, 305, 180/306
See application file for complete search history.

(56) References Cited

U.S. PATENT DOCUMENTS

| | | | | |
|---|---|---|---|---|
| 5,215,327 A | * | 6/1993 | Gatter et al. | 280/5.515 |
| 7,938,217 B2 | * | 5/2011 | Stansbury, III | 180/165 |
| 8,376,100 B2 | * | 2/2013 | Avadhany et al. | 188/316 |
| 2010/0006362 A1 | * | 1/2010 | Armstrong | 180/165 |

FOREIGN PATENT DOCUMENTS

| | | |
|---|---|---|
| EP | 0 715 984 A1 | 6/1996 |
| JP | 61-10220 U | 1/1986 |
| JP | 61-098605 | 5/1986 |
| JP | 63-28517 U | 2/1988 |
| JP | 2-30709 U | 2/1990 |
| JP | 02-306816 | 12/1990 |
| JP | 6-14501 U | 2/1994 |
| JP | 08-048169 | 2/1996 |
| JP | 8-226377 | 9/1996 |
| JP | 2008-275101 | 11/2008 |
| JP | 2009-196623 | 9/2009 |
| JP | 2009-274777 | 11/2009 |

OTHER PUBLICATIONS

International Search Report for corresponding International Application No. PCT/JP2011/055489 mailed Jun. 14, 2011.
Form PCT/ISA/237 for corresponding International Application No. PCT/JP2011/055489 dated Jun. 14, 2011.
Notification of Reasons for Refusal for corresponding Japanese Application No. 2010-195294 issued Dec. 20, 2010.

* cited by examiner

*Primary Examiner* — John Walters
(74) *Attorney, Agent, or Firm* — Renner, Otto, Boisselle & Sklar, LLP

(57) ABSTRACT

The motive power of a hybrid vehicle is the driving power of a gasoline engine, the electric power produced by a generator coupled to the engine, and the electric power obtained by conversion from kinetic energy into electric energy through a regeneration brake during deceleration. Also, an electric vehicle uses the electric power of a battery as its motive power by converting kinetic energy into electric energy through a regeneration brake during deceleration and storing the electric energy. However, the regenerated energy is little. While keeping intact the damping effect of shock absorbers conventionally mounted on the suspension of a vehicle, an oil pump function is added. The electric power produced by storing, in an accumulator, oil pressure-fed from the shock absorbers, driving a hydraulic motor under increased oil pressure, driving a generator coupled to the hydraulic motor is used as part of the motive power.

1 Claim, 7 Drawing Sheets

ENERGY REGENERATION DEVICE FOR EITHER HYBRID VEHICLE OR ELECTRIC AUTOMOBILE

TECHNICAL FIELD

The present invention relates to an energy renewal device for either a hybrid or electric vehicle.

BACKGROUND ART

A hybrid vehicle runs on two types of motive power, namely the motive power of a motor and the motive power of a gasoline engine. The hybrid vehicle stores, in a battery, (a) the electric power produced by the motive power of the gasoline engine and (b) the electric energy obtained by conversion from the kinetic energy of the vehicle through the actuation of a regeneration brake at the time of actuation of an engine brake upon release of the acceleration. However, since the hybrid vehicle runs at a constant speed during travel along the expressway, the electric power produced by the actuation of the regenerative brake is little.

An electric vehicle runs on the electric power of a battery as a source of motive power. The electric vehicle stores, in a battery, the electric energy obtained by conversion from the kinetic energy of the vehicle through the actuation of a regeneration brake at the time of actuation of an engine brake upon release of the acceleration. However, the electric vehicle suffers from the disadvantage of further consumption of electric power during use of air-conditioning and heating equipment, a headlamp, etc. Under such circumstances, there have been demands for improvement in fuel efficiency of hybrid or electric vehicles, in addition to the actuation of the regeneration brake at the time of actuation of the engine brake.

CITATION LIST

Patent Literature 1

Japanese Patent Application Publication, Tokukai, No. 2009-196623 A

SUMMARY OF INVENTION

Technical Problem

The energy regenerating means of a hybrid or electric vehicle is such that the regeneration brake is actuated at the time of actuation of the engine brake upon release of the acceleration, that the kinetic energy of the vehicle is transmitted to a generator through a driving wheel and converted into electric energy to be stored in the battery. However, the efficiency of energy regeneration is low.

A conventional vehicle has stabilized its attitude by utilizing the extension and contraction of shock absorbers to damp (a) up-and-down motions of the wheels due to undulations of the road during travel and (b) changes in attitude of the vehicle due to starting, acceleration, deceleration, and cornering, but has not been able to regenerate energy.

A conventional luxury car or sports car achieves a comfortable ride by sealing nitrogen gas into a shock absorber installed in the suspension part of each wheel, lessening an instantaneous rise in oil pressure due to an abrupt contraction of the shock absorbers by contracting the nitrogen gas, and thereby absorbing the shock. The energy renewal device of the present invention plays the same role as shock absorbers containing nitrogen gas.

It is an object of the present invention to provide an eco-friendly, energy-saving, and comfortable-to-ride-in vehicle by newly adding an efficient energy renewal device to such a conventional energy regeneration device.

Solution to Problem

An energy renewal device of the present invention is an energy renewal device provided in a hybrid or electric vehicle having wheels, the energy renewal device including: shock absorbers A provided for each separate one of the wheels; an accumulator B; a hydraulic motor D; a generator E; an oil tank C; a converter O; and a battery P, while the vehicle is traveling, extension and contraction of the shock absorbers A causing the shock absorbers A provided for each separate one of the wheels to act as oil pumps, oil pressure-fed by the oil pumps being collected in the accumulator B for accumulation and having its pressure raised, the oil pressure thus raised driving the hydraulic motor D, electricity being produced by the generator E coupled to the hydraulic motor D, being rectified by the converter O, and being stored in the battery P. Energy is renewed by converting the energy of extension and contraction of the shock absorbers A of the hybrid or electric vehicle into electric energy.

The energy renewal device of the present invention is configured as follows:

The shock absorbers A each include an oil suction valve port A22, an oil suction valve A10, an oil passage A12, an internal oil suction port A14, a cylinder chamber A4, a piston A5, a plurality of orifices A9, a piston valve A6, a valve spring A7, a cylinder chamber A13, an intra-shaft oil passage A3, an oil discharge port A23, an oil discharge valve A11, and an oil discharge valve port A20. The shock absorbers A perform two functions, namely (i) a function of acting as oil pumps and (ii) a function of bringing about a damping effect, during the contraction of the shock absorbers A and during the extension of the shock absorbers A, respectively, such that during the contraction of the shock absorbers A, each of the shock absorbers A pressure-feeds oil to the oil discharge valve port A20 by causing the oil in the cylinder chamber A13 to flow through the oil discharge port A23 after passing through the intra-shaft oil passage A3 and push open the oil discharge valve A11; at the same time, each of the shock absorbers A causes the oil sucked in through the oil suction valve port A22 to push down the oil suction valve A10, pass through the oil passage A12, and flow into the cylinder chamber A4 through the internal oil suction port A14, and that during the extension of the shock absorbers A, each of the shock absorbers A causes the oil suction valve A10 and the oil discharge valve A11 to be closed, with the oil pressure applied to the oil suction valve A10 and the oil discharge valve A11 at negative pressure, so that the oil in the cylinder chamber A4 passes through the plurality of orifices A9 and pushes down the piston valve A6, and thereby causes the oil to flow into the cylinder chamber A13 while bringing about the damping effect, whereby the oil in the cylinder chamber A13 is pressure-fed into the accumulator B.

The energy renewal device of the present invention is also configured as follows:

The accumulator B is a container including an upper body B02 and a body B01, and has its interior divided by an elastic rubber shell B1 into a gas chamber B2 and an oil chamber B3. The oil chamber B3 includes: a plurality of oil inflow ports B4 through which the oil from the plurality of shock absorbers A flows into the oil chamber B3; an oil discharge port B5 through which the oil flows out of the oil chamber B3; and an oil pressure sensor B6 that measures oil pressure. A shock-absorbing effect is brought about by sealing nitrogen gas into the gas chamber B2, compressing the gas chamber B2 under oil pressure from the shock absorbers A, accumulating the oil, raising the oil pressure, guiding the oil to the hydraulic motor D through the oil discharge port B5, lessening an abrupt change in pressure of the oil from the shock absorbers A by compressing the gas chamber B2, and thereby absorbing the shock.

Advantageous Effects of Invention

An energy renewal device of the present invention provides an energy-saving and eco-friendly vehicle by using, as part of the motive power, the electric power produced by causing the shock absorbers A mounted on the suspension of a hybrid or electric vehicle to repeat extension and contraction in response to (a) up-and-down motions of the wheels due to undulations of the road on which the vehicle is traveling and (b) changes in attitude of the vehicle at the time of starting, acceleration, deceleration, and cornering, causing the hydraulic motor D to be driven by the oil accumulated and pressurized in the accumulator B by the shock absorber A acting as oil pumps, and thereby driving the generator E coupled to the hydraulic motor D.

The energy renewal device of the present invention also provide a comfortable-to-ride-in vehicle by using the accumulator B to accumulate oil, sealing nitrogen gas into a gas chamber B2 in the accumulator B so that the gas chamber. B2 is compressed to lessening the impact caused by an abrupt inflow of the oil from the cylinder chamber A13 through an abrupt contraction of the shock absorbers A under pressure or the like from the road surface, and thereby lessening a shock being transmitted from the road surface to the vehicle's body.

DESCRIPTION OF EMBODIMENTS

In the following, the present embodiment is described with reference to FIGS. 1 through 7 by taking the case of a four-wheel vehicle as an example. It should be noted, however, that the present embodiment can be similarly implemented in the case of a vehicle having a plurality of wheels such as a two-wheel or three-wheel vehicle, too.

Figure 1:
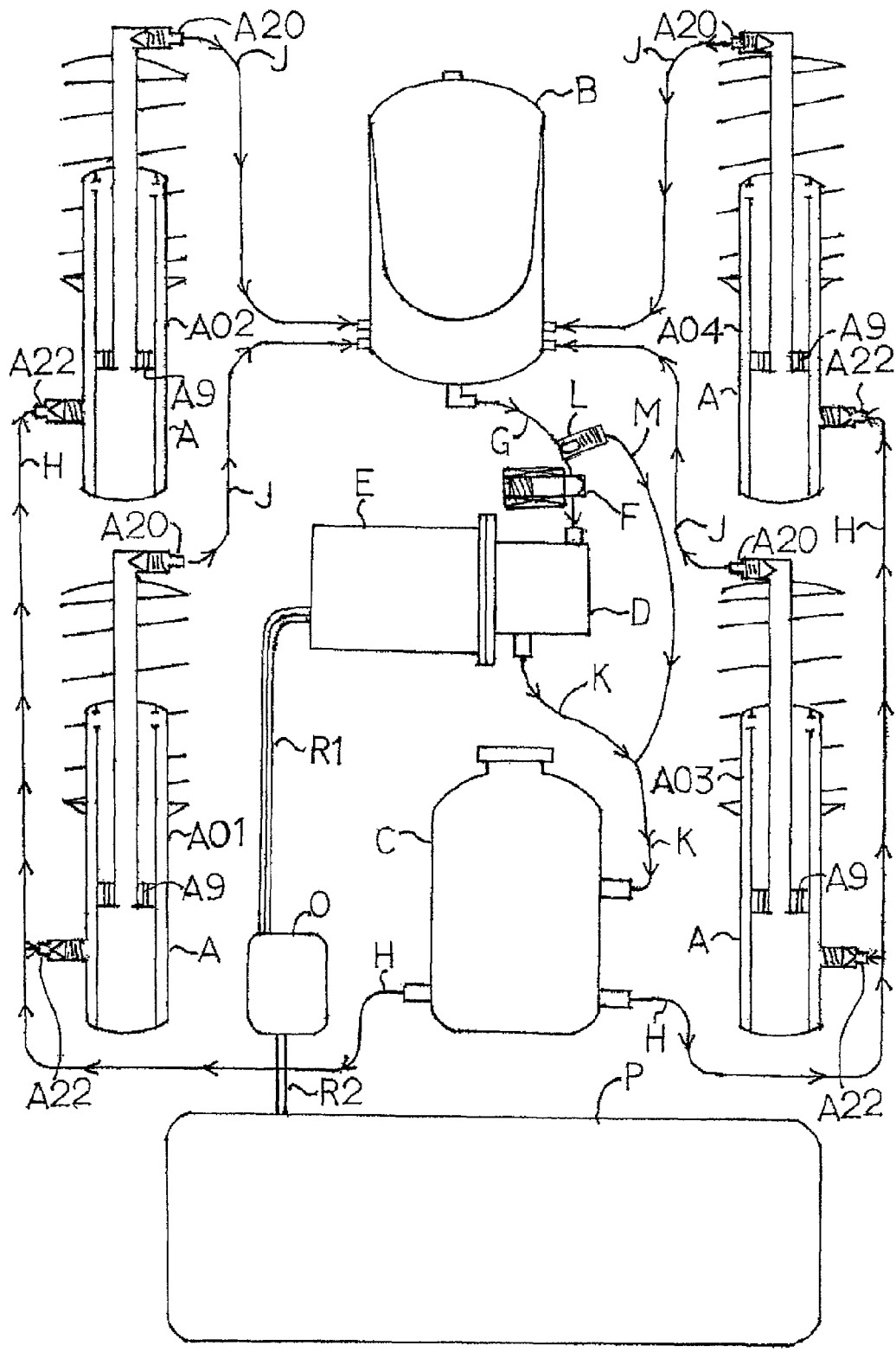
FIG. 1 is a schematic diagram showing a configuration of an energy renewal system of a vehicle using an energy renewal device of the present invention and the flow of oil during actuation.
Figure 2:
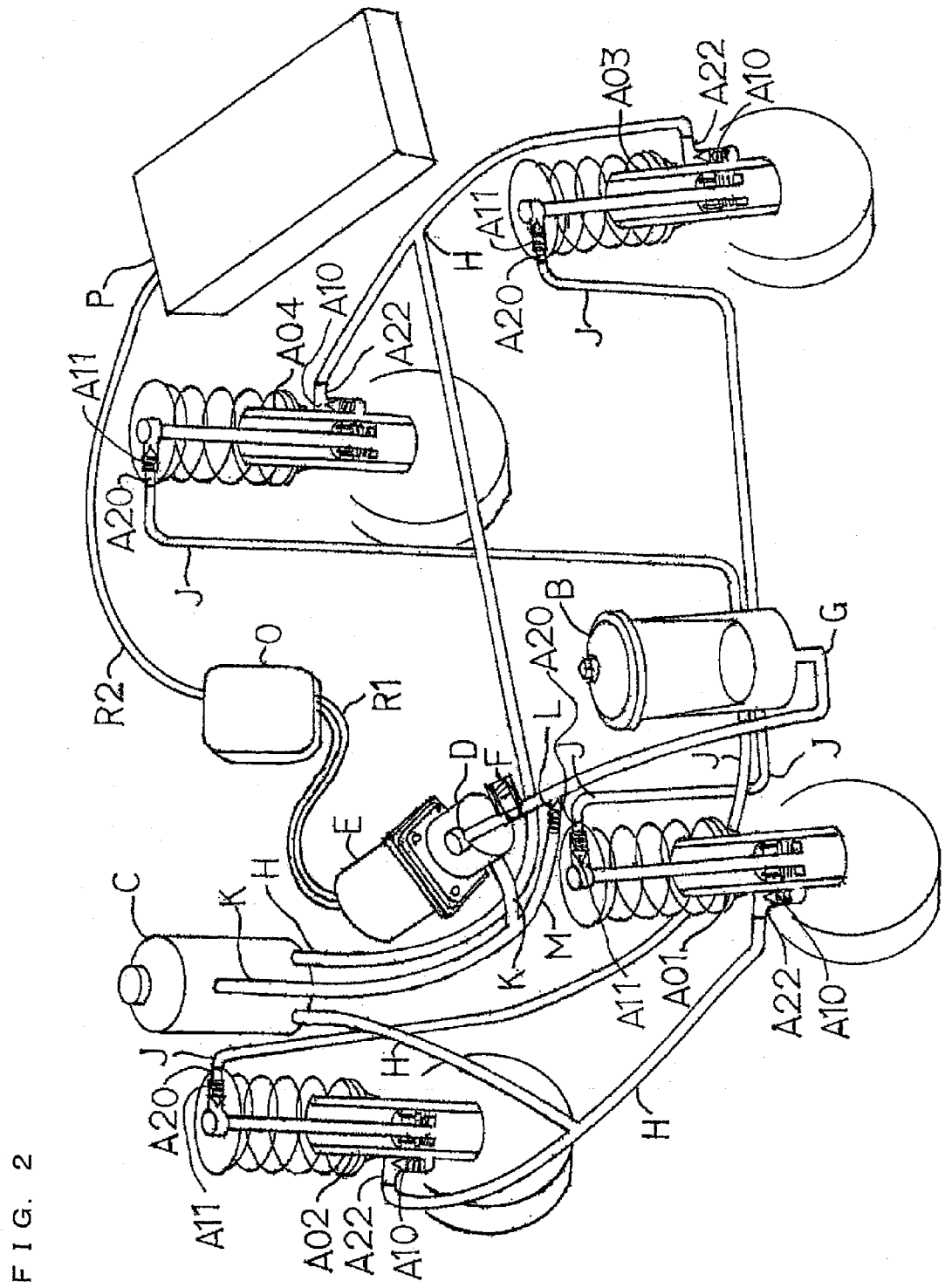
FIG. 2 is a schematic diagram showing an energy renewal system of a vehicle using an energy renewal device of the present invention.
Figure 3:
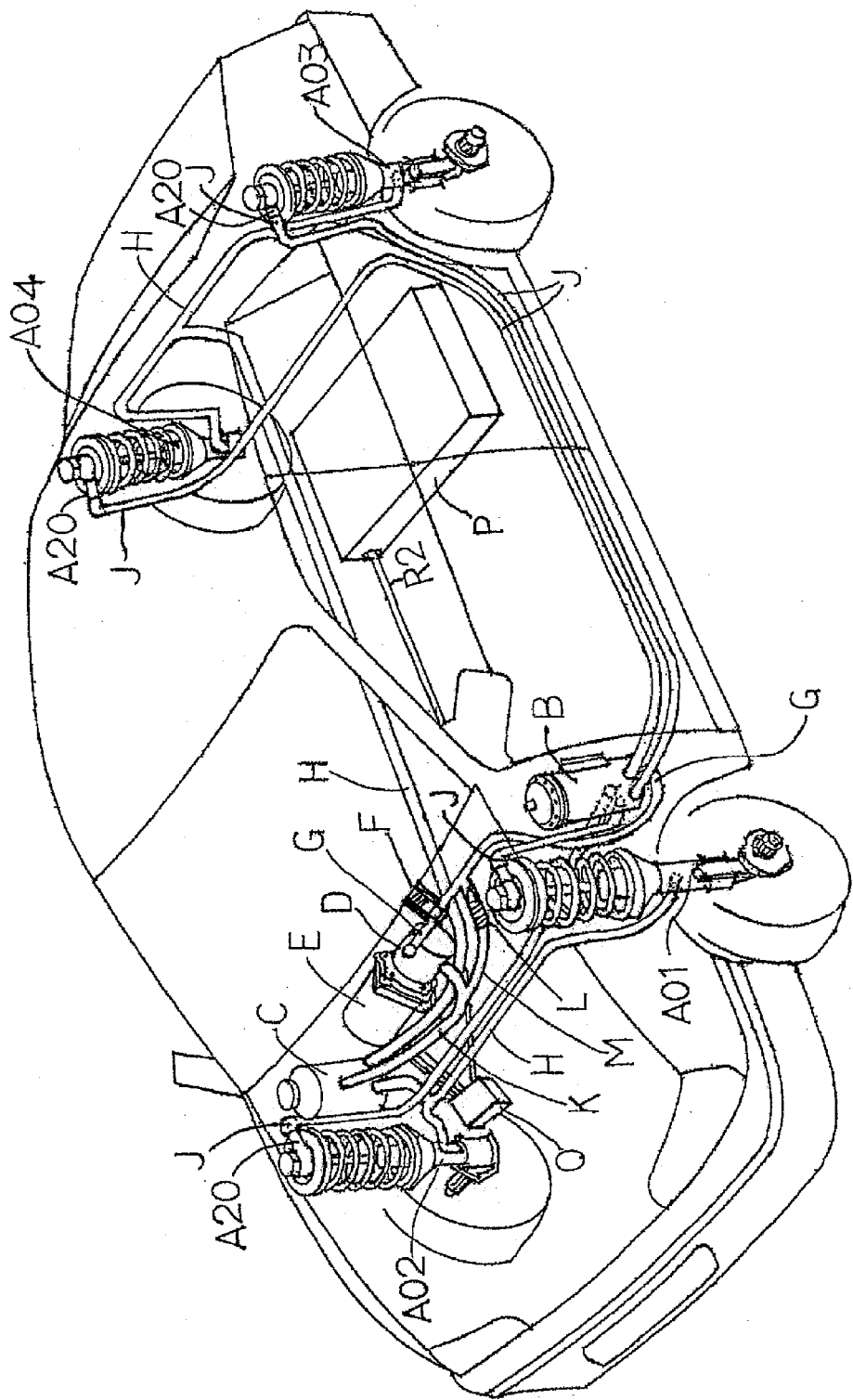
FIG. 3 shows an exterior configuration of an energy renewal system of a vehicle using an energy renewal device of the present invention.

FIG. 1 is a schematic diagram showing a configuration of an energy renewal system of a vehicle using an energy renewal device of the present invention and the flow of oil during actuation. FIG. 2 is a schematic diagram showing an energy renewal system of a vehicle using an energy renewal device of the present invention. FIG. 3 shows an exterior configuration of an energy renewal system of a vehicle using an energy renewal device of the present invention. First, a configuration of an energy renewal device of the present invention is described with reference to FIGS. 1 through 3.

The energy renewal device of the present invention has shock absorbers A (A01, A02, A03, and A04) installed in the respective suspension parts, and uses, as a source of energy, the extension and contraction of the shock absorbers A due to (a) up-and-down motions of the wheels due to undulations of the road on which the hybrid or electric vehicle is traveling and (b) changes in attitude of the vehicle due to starting, acceleration, deceleration, cornering, etc. The shock absorbers A acts as oil pumps so that oil is accumulated in the accumulator B and has its pressure raised. The oil pressure thus raised drives a hydraulic motor D, and electricity is produced by a generator E connected to the hydraulic motor D. The electric power thus produced is rectified by a converter O and stored in a battery P so as to be utilizable as renewal energy.

The energy renewal device of the present invention includes the shock absorbers A (A01, A02, A03, and A04), the accumulator B, the hydraulic motor D, the generator E, an oil tank C, the converter O, the battery P, etc. Each of the shock absorbers A, installed in the respective suspension parts of the four wheels, is fitted with an oil suction valve A10 and an oil discharge valve A11.

Each of the shock absorbers A (A01, A02, A03, and A04) has an oil suction valve port A22 with an oil supply hose H connected to the oil suction valve port A22, and has an oil discharge valve port A20 with a discharge oil pipe J connected to the oil discharge valve port A20. The oil supply hose H is connected to the oil tank C, and the discharge oil pipe J is connected to the accumulator B. The accumulator B and the hydraulic motor D are connected to each other through an oil pipe G mounted with an electromagnetic valve F. The generator E is coupled to the hydraulic motor D. The hydraulic motor D and the oil tank C are connected to each other through a return pipe K. Connected to the return pipe K is a oil pressure relief pipe M diverging from the oil pipe G and mounted with a pressure relief valve L. The generator E and the converter O are connected to each other through a generator-side wire R1, and the converter O and the battery P are connected each other through a battery-side wire R2.

Next, the flow of oil in the energy renewal device of the present invention is described. The oil from the plurality of shock absorbers A (A01, A02, A03, and A04) installed in the respective suspension parts passes through the discharge oil pipe J, and is collected in the accumulator B. The electric power produced by driving hydraulic motor D under oil pressure from the accumulator B and thereby driving the generator E coupled to the hydraulic motor D is rectified by the converter O by connecting the generator E and the converter O through the generator-side wire R1, and is transmitted to the battery P by connecting the converter O and the battery P through the battery-side wire R2. The oil from the hydraulic motor D returns to the oil tank C, and is fed to the plurality of shock absorbers A through the oil supply hose H connected to the oil tank C. When the pressure of the oil in the accumulator B has reached a pressure equal to or higher than a set pressure, the pressure relief valve L mounted on the oil pressure relief pipe M diverging from the oil pipe G is pushed open by the oil pressure, so that the pressure is kept constant by discharging the oil into the oil tank C through the return pipe K connected to the oil pressure relief pipe M.

Figure 4:
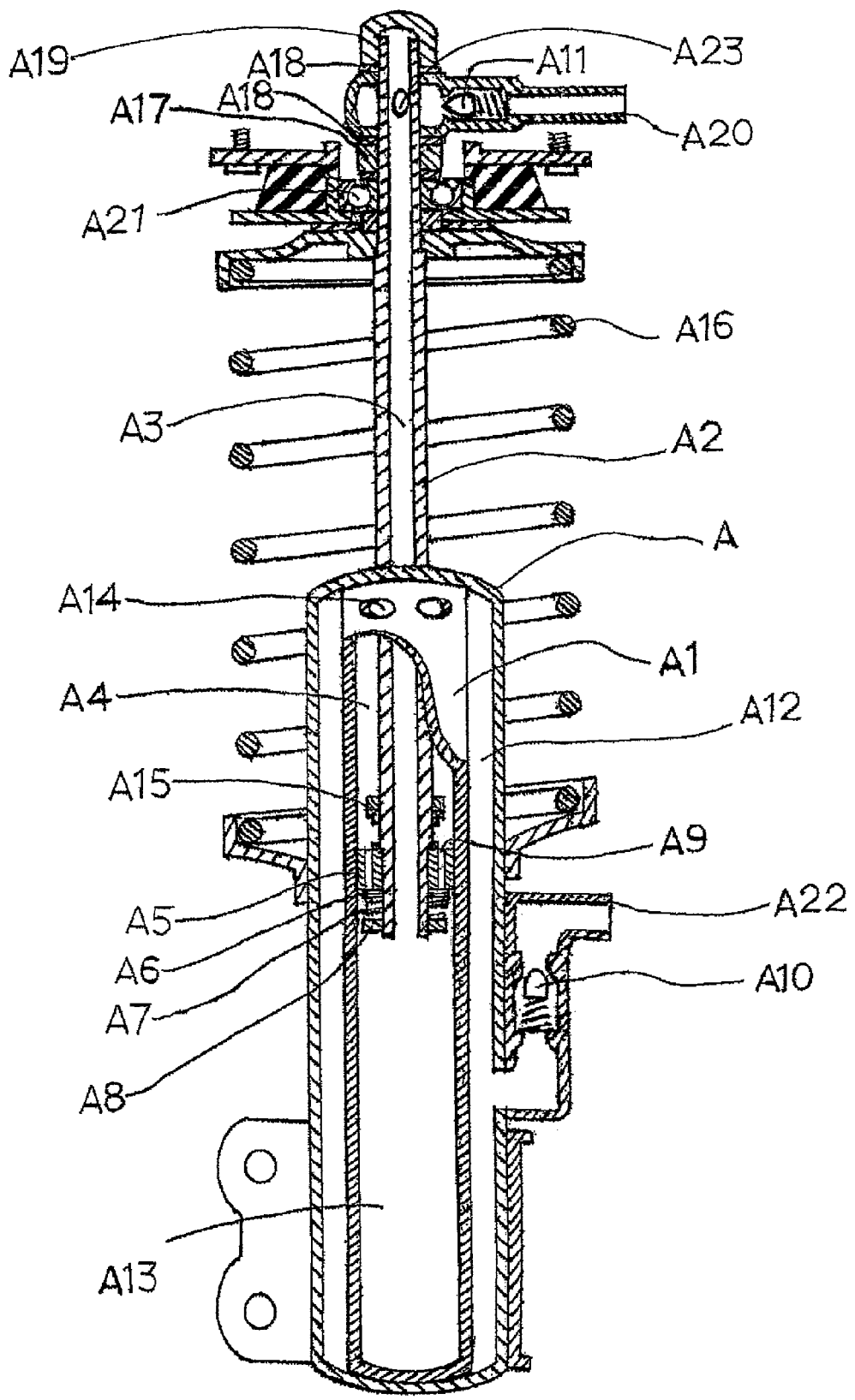
FIG. 4 is a cross-sectional view of a shock absorber of the present invention.

FIG. 4 shows a configuration of a shock absorber A of the present invention.

The shock absorbers installed in the respective suspension parts of a conventional vehicle is intended to bring about a damping effect. A shock absorber A of the present invention acts as an oil pump in addition to performing the conventional damping function. The shock absorber A includes an oil suction valve port A22, an oil suction valve A10, an oil passage A12, an internal oil suction port A14, a cylinder chamber A4, a piston A5, orifices A9, a piston valve A6, a valve spring A7, a cylinder chamber A13, an intra-shaft oil passage A3, an oil discharge port A23, an oil discharge valve A11, an oil discharge valve port A20, etc.

Figure 5:
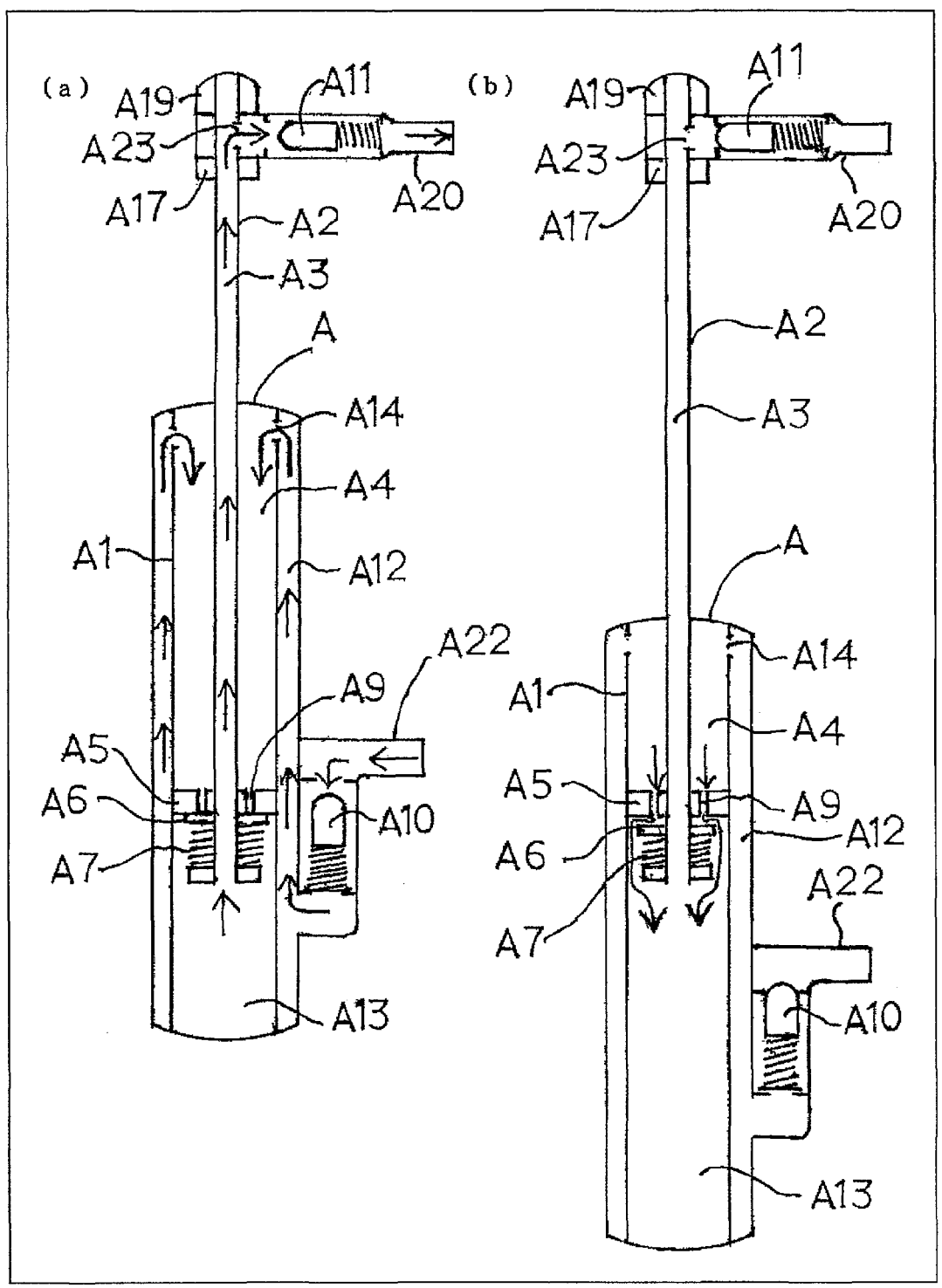
FIG. 5 is a schematic diagram explaining how a shock absorber of the present invention operates (a) during contraction and (b) during extension.

FIG. 5 is a diagram explaining how a shock absorber A of the present invention operates, and shows a cross-sectional view of the shock absorber A. (a) shows a state of the shock absorber A during contraction, and (b) shows a state of the shock absorber A during extension. In the shock absorber A during contraction, as shown in (a) of FIG. 5, the oil in the cylinder chamber A13 flows through the oil discharge port A23 after passing through the intra-shaft oil passage A3, and pushes open the oil discharge valve A11 to be pressure-fed to the oil discharge valve port A20; at the same time, the oil is sucked in through the oil suction valve port A22 to push down the oil suction valve A10, and flows into the cylinder chamber A4 through the internal oil suction port A14 after passing through the oil passage A12. In the shock absorber A during extension, as shown in (b) of FIG. 5, the oil suction valve A10 is closed under pressure from the cylinder chamber A4, and the oil discharge valve A11 is closed under negative pressure from the cylinder chamber A13, so that the oil in the cylinder chamber A4 passes through the orifices A9, which include a plurality of narrow holes, of the piston A5 and pushes down the piston valve A6 for passage. The resistance of the oil passing through the orifices A9 and the resistance of the oil pushing down the piston valve A6 brings about a damping effect.

Figure 6:
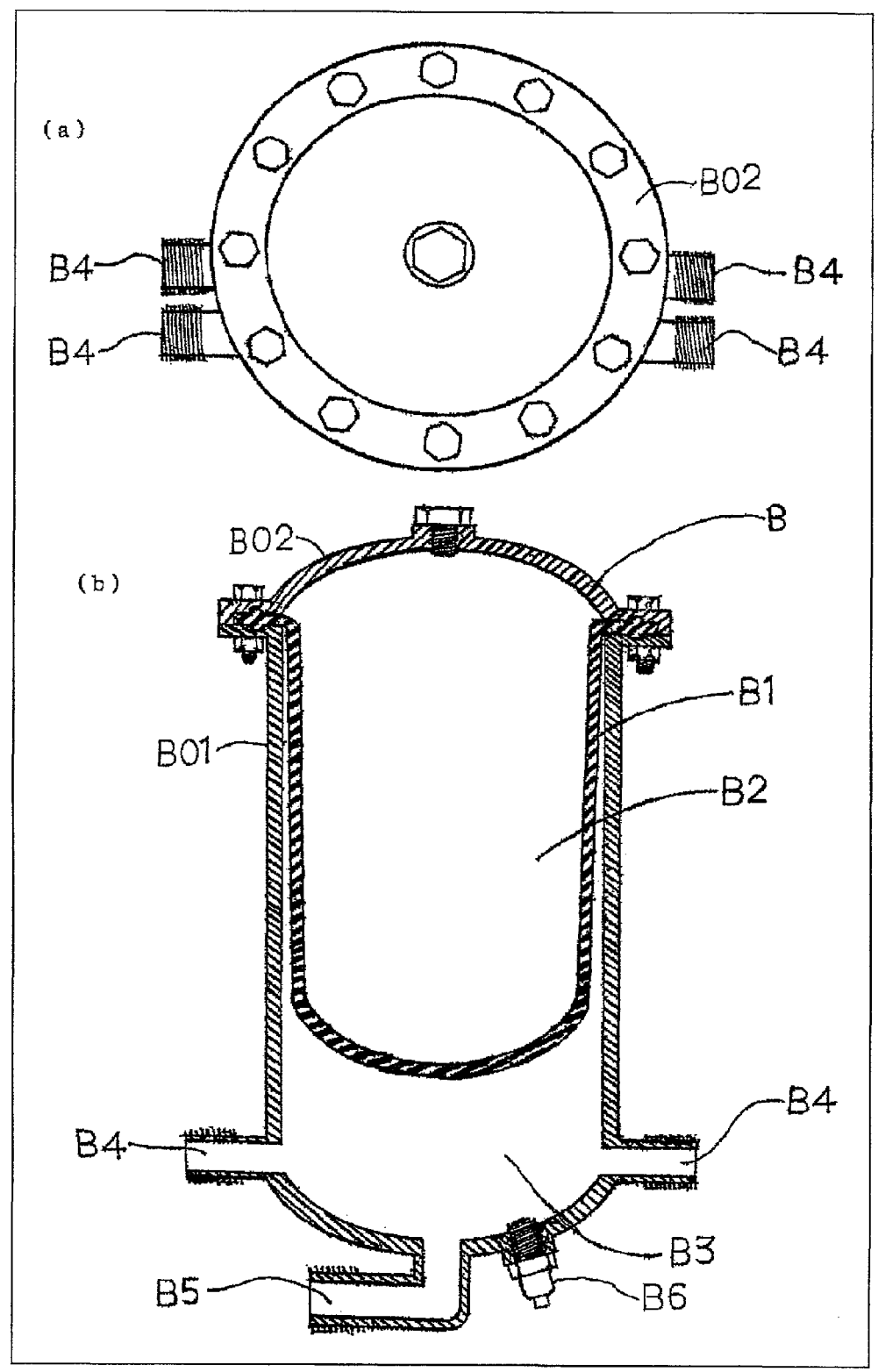
FIG. 6 shows (a) a plan view and (b) a side cross-sectional view of a configuration of an accumulator of the present invention.

FIG. 6 shows (a) a plan view and (b) a side cross-sectional view of a configuration of the accumulator B. The accumulator B is divided into two parts, namely an upper body B02 and a body B01. The accumulator B has a rubber shell B1, a gas chamber B2, an oil chamber B3, four oil inflow ports B4, an oil discharge port B5, and an oil pressure sensor B6. The rubber shell B1 is elastic, and is placed in the accumulator B. The gas chamber B2, placed in the rubber shell B1, has nitrogen gas sealed therein. The oil pressure sensor B6 is provided for detecting pressure in the oil chamber B3. When the measured value of oil pressure in the oil chamber B3 is converted into an electric signal and reaches the set pressure, the electromagnetic valve F is opened through a relay circuit, so that the oil is discharged through the oil discharge port B5 to drive the hydraulic motor D and the oil is pressure-fed from the shock absorbers A (A01, A02, A03, and A04) through the four oil inflow ports B4, respectively.

Figure 7:
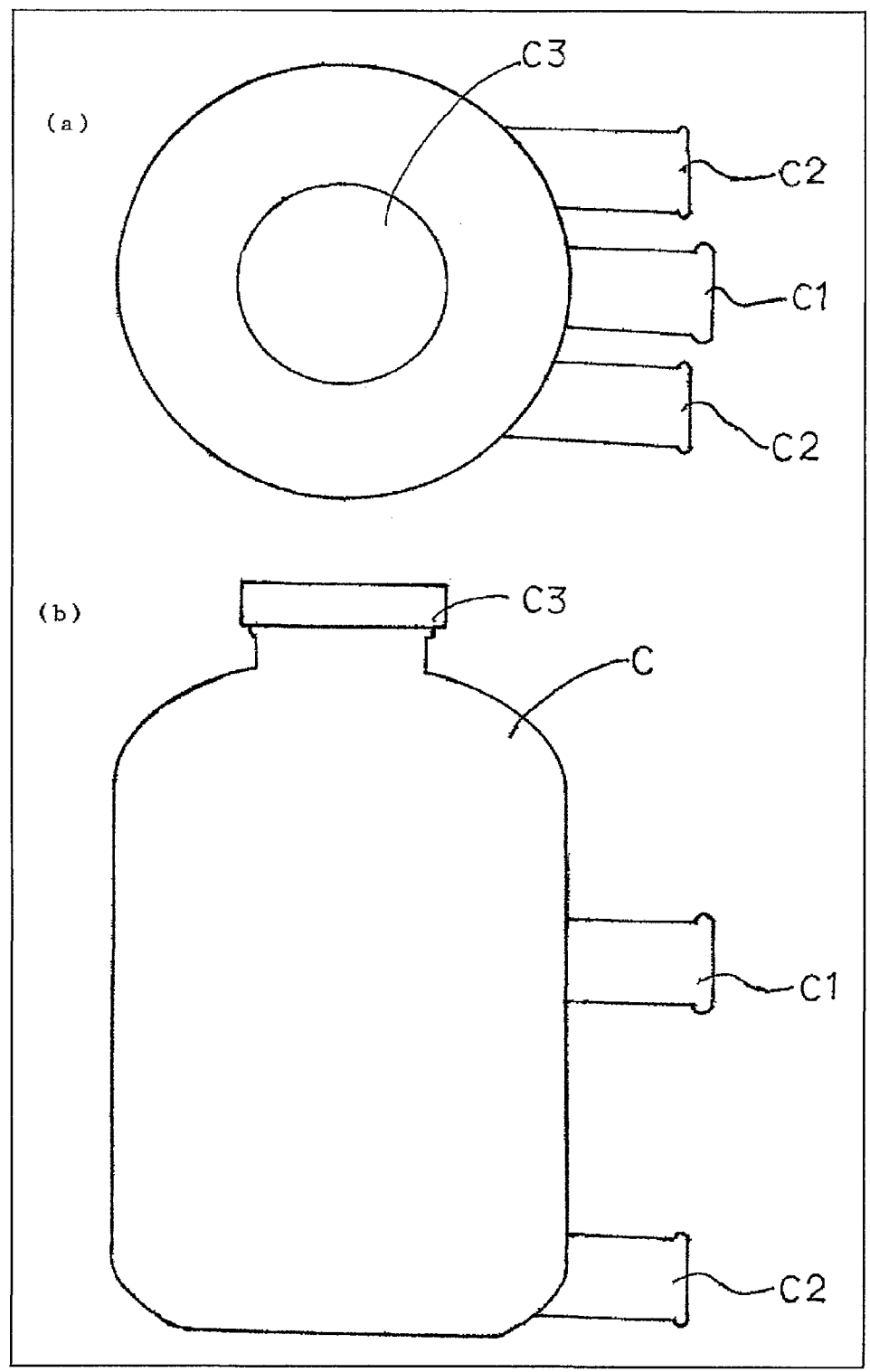
FIG. 7 shows (a) a plan view and (b) a side view of a configuration of an oil tank of the present invention.

FIG. 7 shows (a) a plan view and (b) a side view of a configuration of the oil tank C. The oil tank C has an oil inflow port C1, a plurality of oil outflow ports C2, an oil injection port C3. The oil tank C stores the oil discharged out of the hydraulic motor D and sends out the oil to each of the shock absorbers A.

REFERENCE SIGNS LIST

| | |
|---|---|
| A | Shock absorber |
| A01 | Shock absorber of front left wheel |
| A02 | Shock absorber of front right wheel |
| A03 | Shock absorber of rear left wheel |
| A04 | Shock absorber of rear right wheel |
| A1 | Piston cylinder |
| A2 | Piston shaft |
| A3 | Intra-shaft oil passage |
| A4 | Cylinder chamber |
| A5 | Piston |
| A6 | Piston valve |
| A7 | Valve spring |
| A8 | Valve spring nut |
| A9 | Orifice |
| A10 | Oil suction valve |
| A11 | Oil discharge valve |
| A12 | Oil passage |
| A13 | Cylinder chamber |
| A14 | Internal oil suction port |
| A15 | Stopper |
| A16 | Coil spring |
| A17 | Intermediate nut |
| A18 | Gasket |
| A19 | Cap nut |
| A20 | Oil discharge valve port |
| A21 | Bearing |
| A22 | Oil suction valve port |
| A23 | Oil discharge port |
| B | Accumulator |
| B01 | Body |
| B02 | Upper body |
| B1 | Rubber shell |
| B2 | Gas chamber |
| B3 | Oil chamber |
| B4 | Oil inflow port |
| B5 | Oil discharge port |
| B6 | Oil pressure sensor |
| C | Oil tank |
| C1 | Oil inflow port |
| C2 | Oil outflow port |
| C3 | Oil injection port |
| D | Hydraulic motor |
| E | Generator |
| F | Electromagnetic valve |
| G | Oil pipe |
| H | Oil supply hose |
| J | Discharge oil pipe |
| K | Return pipe |
| L | Pressure relief valve |
| M | Oil pressure relief valve |
| O | Converter |
| P | Battery |
| R1 | Generator-side wire |
| R2 | Battery-side wire |

The invention claimed is:

1. An energy renewal device provided in a hybrid or electric vehicle having wheels, the energy renewal device comprising:
shock absorbers (A) provided for each separate one of the wheels;
an accumulator (B);
a hydraulic motor (D);
a generator (E);
an oil tank (C);
a converter (O); and
a battery (P),
the shock absorbers (A) each including an oil suction valve port (A22), an oil suction valve (A10), an oil passage (A12), an internal oil suction port (A14), a cylinder chamber (A4), a piston (A5), a plurality of orifices (A9), a piston valve (A6), a valve spring (A7), a cylinder chamber (A13), an intra-shaft oil passage (A3), an oil discharge port (A23), an oil discharge valve (A11), and an oil discharge valve port (A20), while the vehicle is traveling, extension and contraction of the shock absorbers (A) causing the shock absorbers (A) provided for each separate one of the wheels to act as oil pumps, the shock absorbers (A) performing two functions, namely (i) a function of acting as oil pumps and (ii) a function of bringing about a damping effect, during the contraction of the shock absorbers (A) and during the extension of the shock absorbers (A), respectively, such that during the contraction of the shock absorbers (A), each of the shock absorbers (A) pressure-feeds oil into the accumulator B through the oil discharge valve port (A20) by causing the oil in the cylinder chamber (A13) to flow through the oil discharge port (A23) after passing through the intra-shaft oil passage (A3) and push open the oil discharge valve (A11); at the same time, each of the shock absorbers (A) causes the oil sucked in through the oil suction valve port (A22) to push down the oil suction valve (A10), pass through the oil passage (A12), and flow into the cylinder chamber (A4) through the internal oil suction port (A14), and that during the extension of the shock absorbers (A), each of the shock absorbers (A) causes the oil suction valve (A10) and the oil discharge valve (A11) to be closed so that the oil in the cylinder chamber (A4) passes through the plurality of orifices (A9) of the piston (A5) and pushes down the piston valve (A6), and thereby causes the oil to flow into the cylinder chamber (A13) while bringing about the damping effect, the oil pressure-fed from the shock absorbers (A) being accumulated in the accumulator (B) and having its pressure raised, the oil pressure thus raised driving the hydraulic motor (D), electricity being produced by the generator (E) coupled to the hydraulic motor (D) and being transmitted to the battery (P) so that the hybrid or electric vehicle is charged with auxiliary electric power.

\* \* \* \* \*